United States Patent
Parod et al.

(10) Patent No.: US 9,974,245 B2
(45) Date of Patent: May 22, 2018

(54) AUTOMATED ADJUSTABLE DROP HOSE FOR MECHANIZED IRRIGATION

(71) Applicant: Lindsay Corporation, Omaha, NE (US)

(72) Inventors: Richard W. Parod, Omaha, NE (US); Richard Edward Provaznik, Omaha, NE (US); Kurt Ivan Cook, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 0 days. days.

(21) Appl. No.: 15/242,661

(22) Filed: Aug. 22, 2016

(65) Prior Publication Data

US 2018/0049381 A1    Feb. 22, 2018

(51) Int. Cl.
| | |
|---|---|
| B05B 3/00 | (2006.01) |
| A01G 25/09 | (2006.01) |
| B65H 75/30 | (2006.01) |
| A01M 7/00 | (2006.01) |
| B05B 15/06 | (2006.01) |

(52) U.S. Cl.
CPC ............ *A01G 25/09* (2013.01); *A01G 25/092* (2013.01); *A01M 7/005* (2013.01); *A01M 7/0075* (2013.01); *B05B 15/066* (2013.01); *B65H 75/30* (2013.01); *B65H 2701/333* (2013.01)

(58) Field of Classification Search
CPC ...... A01G 25/09; A01G 25/092; B65H 75/30; B65H 2701/333; A01M 7/005; A01M 7/0075; B05B 15/066
USPC ....... 239/726, 728, 723, 735, 736, 744, 745, 239/195, 197, 160, 162, 164, 169, 175, 239/588
See application file for complete search history.

(56) References Cited

U.S. PATENT DOCUMENTS

| | | | |
|---|---|---|---|
| 4,763,836 A * | 8/1988 | Lyle | A01G 25/09 239/733 |
| 4,795,100 A | 1/1989 | Purtell et al. | |
| 5,709,343 A | 1/1998 | Myers | |
| 5,779,163 A | 7/1998 | Gunter | |
| 6,036,121 A * | 3/2000 | Gerdes | A01G 25/162 239/728 |
| 8,573,544 B2 | 11/2013 | Shelton | |
| 8,584,968 B2 | 11/2013 | Nelson et al. | |

* cited by examiner

*Primary Examiner* — Steven J Ganey
(74) *Attorney, Agent, or Firm* — Hovey Williams LLP

(57) ABSTRACT

A nozzle height adjustment subsystem for use with an irrigation system comprises a spool, a rotation device, and a control device. The spool includes a central hub and is configured to retain a drop hose to which a nozzle is attached. The rotation device is coupled to the spool and rotates the spool in a first direction or a second, opposite direction when it is activated. The control device includes electronic circuitry that is configured to generate a signal that activates the rotation device.

13 Claims, 6 Drawing Sheets

AUTOMATED ADJUSTABLE DROP HOSE FOR MECHANIZED IRRIGATION

BACKGROUND OF THE INVENTION

Field of the Invention

Embodiments of the current invention relate to apparatuses for adjusting the height of a drop hose of a mechanized irrigation system.

Description of the Related Art

Mechanized agricultural irrigation systems such as central pivot irrigation machines are commonly used to irrigate crops. A central pivot irrigation machine typically includes, among other things, a central pivot communicating with a pressurized water supply and a series of spans formed from mobile support towers connected to the central pivot and to one another by truss-type framework sections. The mobile support towers are supported on wheels that are driven by a motor on each tower. A water distribution conduit is supported by the framework sections and a number of sprinkler heads, spray guns, drop hoses with nozzles, or other fluid-emitting devices are spaced along the length of the conduit.

In irrigation systems that include drop hoses with nozzles, each drop hose may be connected to the water distribution conduit through an inverted U-shaped coupler or pipe. The drop hose hangs down from the connection, and a water-distribution nozzle, which sprays water radially outward, may be attached to the free end of the drop hose. Positioning the nozzle at the proper height above the crops is critical. If the nozzle is too high above the crops, wind may catch the water and turn it to mist that may evaporate before the water can reach the crops, especially on hot, dry days. On the other hand, if the nozzle is too close to the crops, the sprayed water may be blocked before it can reach its maximum radial spraying distance.

Several approaches exist for adjusting the height of the nozzle ranging from manually wrapping the hose around the conduit to adding components to the hose that create adjustable diameter loops. Each of these approaches is very labor intensive and requires one or more workers to visit the site of the irrigation system to manually perform the adjustments. In addition, a single irrigation system may have dozens of drop hoses, and the adjustment may need to be performed several times per growing season. Furthermore, rapidly growing crops require periodic adjustment of the nozzle height—creating a potential scheduling problem for the maintainer of the irrigation system.

SUMMARY OF THE INVENTION

Embodiments of the current invention solve the above-mentioned problems and provide a distinct advance in the art of mechanized irrigation systems. More particularly, embodiments of the invention provide a nozzle height adjustment subsystem which adjusts a height of a nozzle attached to an irrigation system drop hose.

The nozzle height adjustment subsystem may comprise a spool, a rotation device, and a control device. The spool includes a central hub and is configured to retain a drop hose to which a nozzle is attached. The rotation device is coupled to the spool and rotates the spool in a first direction or a second, opposite direction when it is activated. The control device includes electronic circuitry that is configured to generate a signal that activates the rotation device.

Embodiments of the current invention may further provide an irrigation system comprising a plurality of mobile support towers, a fluid carrying conduit, a plurality of drop hose and nozzle assemblies, and a plurality of nozzle height adjustment subsystems. The fluid carrying conduit may be supported by the mobile support towers and may provide fluid from a fluid source. Each drop hose and nozzle assembly may include a connecting hose, a drop hose, and a nozzle. The connecting hose may be coupled to the fluid conduit. The drop hose may receive fluid from the connecting hose. The nozzle is connected to one end of the drop hose and may disperse fluid on crops. Each nozzle height adjustment subsystem may include a spool, an electric motor, and a control device. The spool includes a central hub and may retain at least a portion of one drop hose. The electric motor includes a shaft coupled to the central hub. When the electric motor is activated, it may rotate the spool in a first direction or a second, opposite direction. The control device may include electronic circuitry configured to generate a signal that activates the electric motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 5:
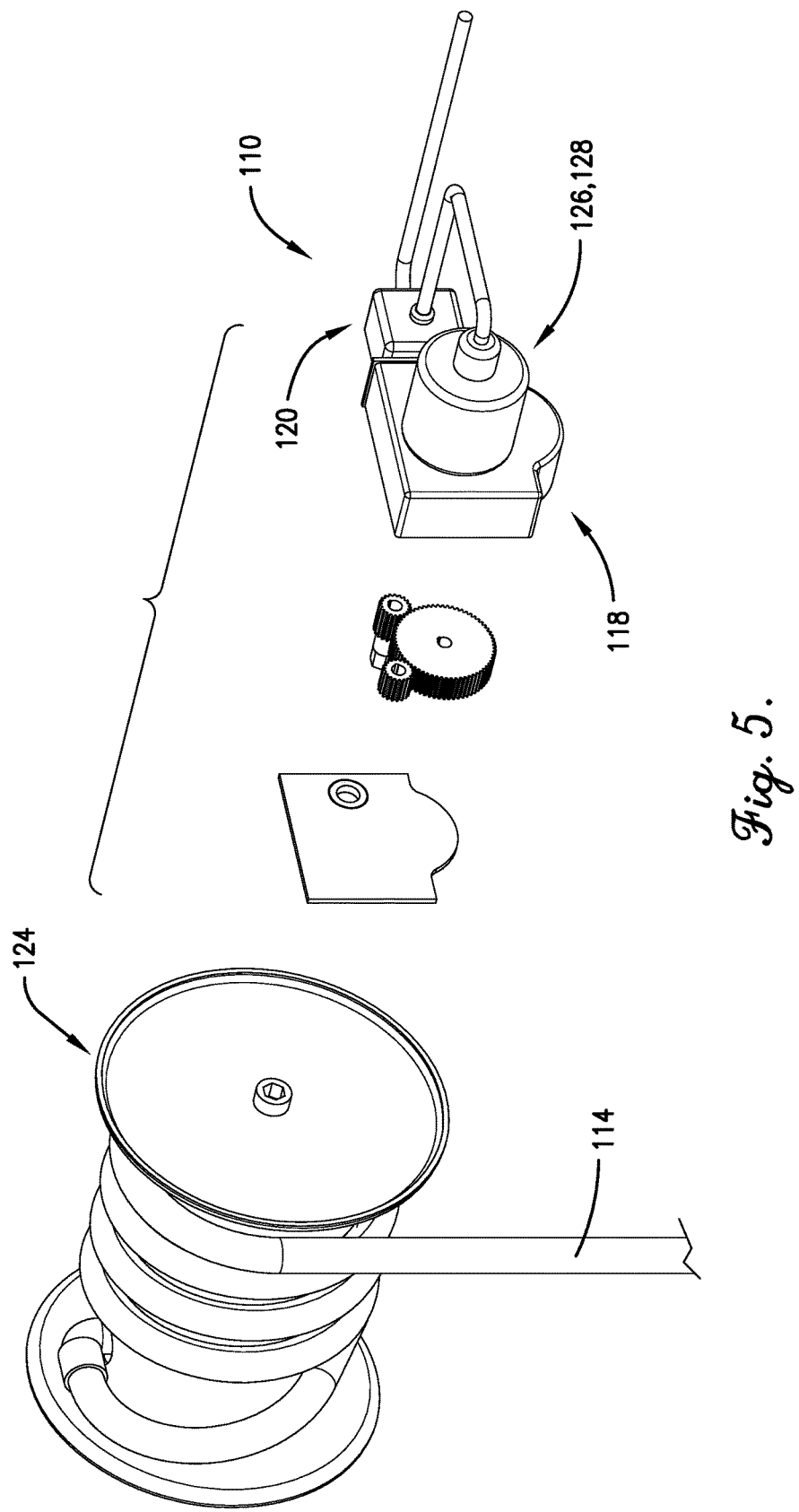
Figure 6:
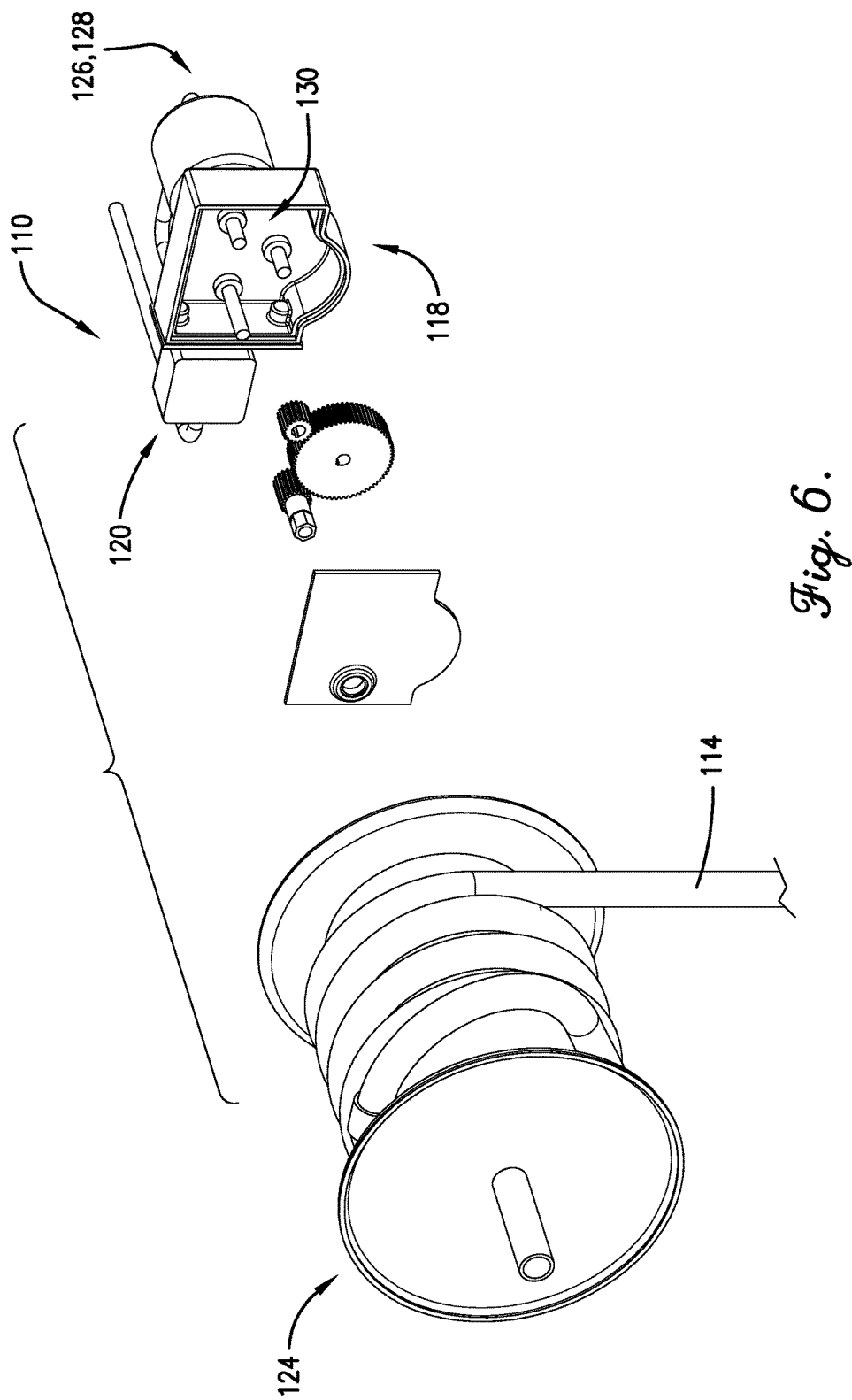

FIG. 5 is a perspective view from a right side of a portion of one drop hose and nozzle assembly, showing one nozzle height adjustment subsystem partially exploded; and FIG. 6 is a perspective view from a left side of a portion of one drop hose and nozzle assembly, showing one nozzle height adjustment subsystem partially exploded The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
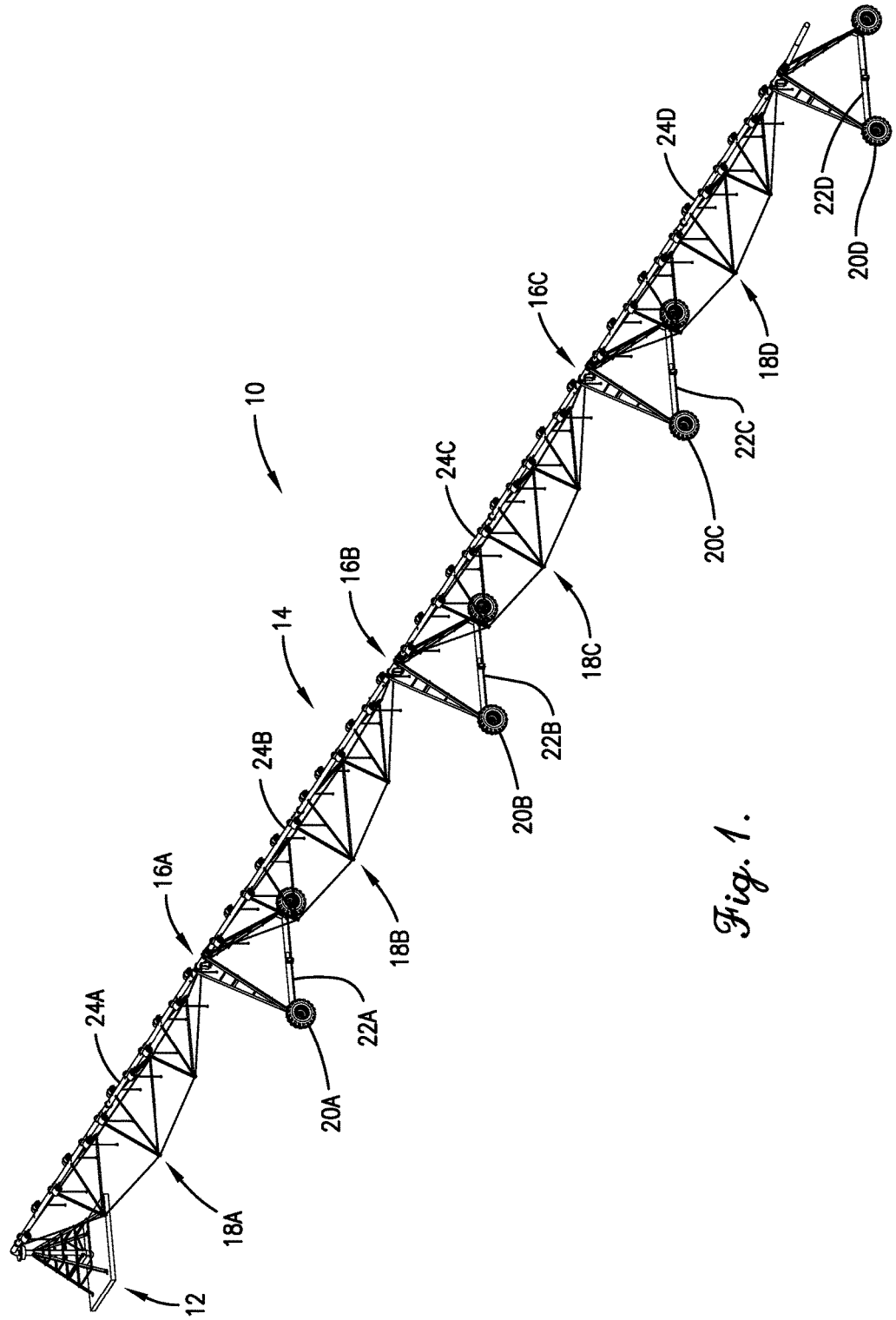
FIG. 1 is a perspective view of a mechanized irrigation system constructed in accordance with various embodiments of the current invention and broadly comprising a fixed central pivot, a plurality of mobile support towers, and a plurality of fluid carrying conduit sections.

Turning now to the drawing figures, and initially FIG. 1, an exemplary irrigation system 10 on which principles of the current invention may be implemented is illustrated. An embodiment of the irrigation system 10 is a central pivot irrigation system and broadly comprises a fixed central pivot 12 and a main section 14 pivotally connected to the central pivot. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot has access to a well, water tank, or other source of water and may also be coupled with a tank or other source of agricultural products to inject fertilizers, pesticides and/or other chemicals into the water for application during irrigation.

The main section 14 may comprise any number of mobile support towers 16A-D, the outermost 16D of which is referred to herein as an end tower. The support towers are connected to the fixed central pivot 12 and to one another by truss sections 18A-D or other supports to form a number of interconnected spans.

The mobile towers have wheels 20A-D, at least one of which is driven by suitable drive motors 22A-D. Each motor 22A-D turns at least one of its wheels 22A-D through a drive shaft to move its mobile tower and thus the main section in a circle about the central pivot to irrigate a field. The motors 22A-D may include integral or external relays so they may be turned on, off, and reversed as described below. The motors may also have several speeds or be equipped with variable speed drives.

Each of the truss sections 18A-D carries or otherwise supports a conduit section 24A-D or other fluid distribution mechanism that is connected in fluid communication with all other conduit sections.

The irrigation system 10 may also include an optional extension arm (not shown) pivotally connected to the end tower and may be supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 10 illustrated in FIG. 1 has four mobile support towers; however, it may comprise any number of mobile support towers, truss sections, wheels, and drive motors without departing from the scope of the current invention.

The irrigation system 10 may also include a main control system for controlling movement of the mobile towers 16A-D and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

In accordance with aspects of the current invention, the irrigation system 10 also includes an alignment control system for maintaining alignment of the mobile towers 16A-D while minimizing simultaneous power usage of the mobile tower drive motors 22A-D. The alignment control system will not be discussed in depth but may be implemented with hardware, software, firmware, or combinations thereof.

In addition to the components described above, the irrigation system 10 may comprise a plurality of drop hose and nozzle assemblies 100 and a plurality of nozzle height adjustment subsystems 110, best seen in FIGS. 2-6. Each nozzle height adjustment subsystem 110 interacts with one drop hose and nozzle assembly 100 to set a height of a nozzle above the crops to be irrigated.

Each drop hose and nozzle assembly 100 may include a connecting hose 112, a drop hose 114, and a nozzle 116. The connecting hose 112 may include a coupler, a rigid portion, and a flexible portion. The coupler may connect to one of the water conduit sections 24A-D. The rigid portion may be formed from metals or hardened materials and may have an inverted U-shape, once installed. One end of the rigid portion may connect to the coupler. The flexible portion may be formed from flexible rubber or other materials and may have a first end connected to the rigid portion and a second end connected to one nozzle height adjustment subsystem 110.

The drop hose 114 may be formed from flexible, resilient material such as rubber, various polymers, mesh material, or the like, or combinations thereof. The drop hose 114 may have a generally elongated tubular construction that is capable of allowing water or other liquids to flow therethrough. A first end of the drop hose 114 may couple to one nozzle height adjustment subsystem 110, while an opposing second end may extend toward the ground.

The nozzle 116 may be formed from hardened plastics, rubbers, metals, or combinations thereof and may include a coupler at one end and a sprayer at the opposing end. The coupler may connect to the second end of the drop hose 114. The sprayer may include a plurality of openings or holes that produce a mist, a spray, or one or more streams of fluid directed at a target crop or plant.

Figure 2:
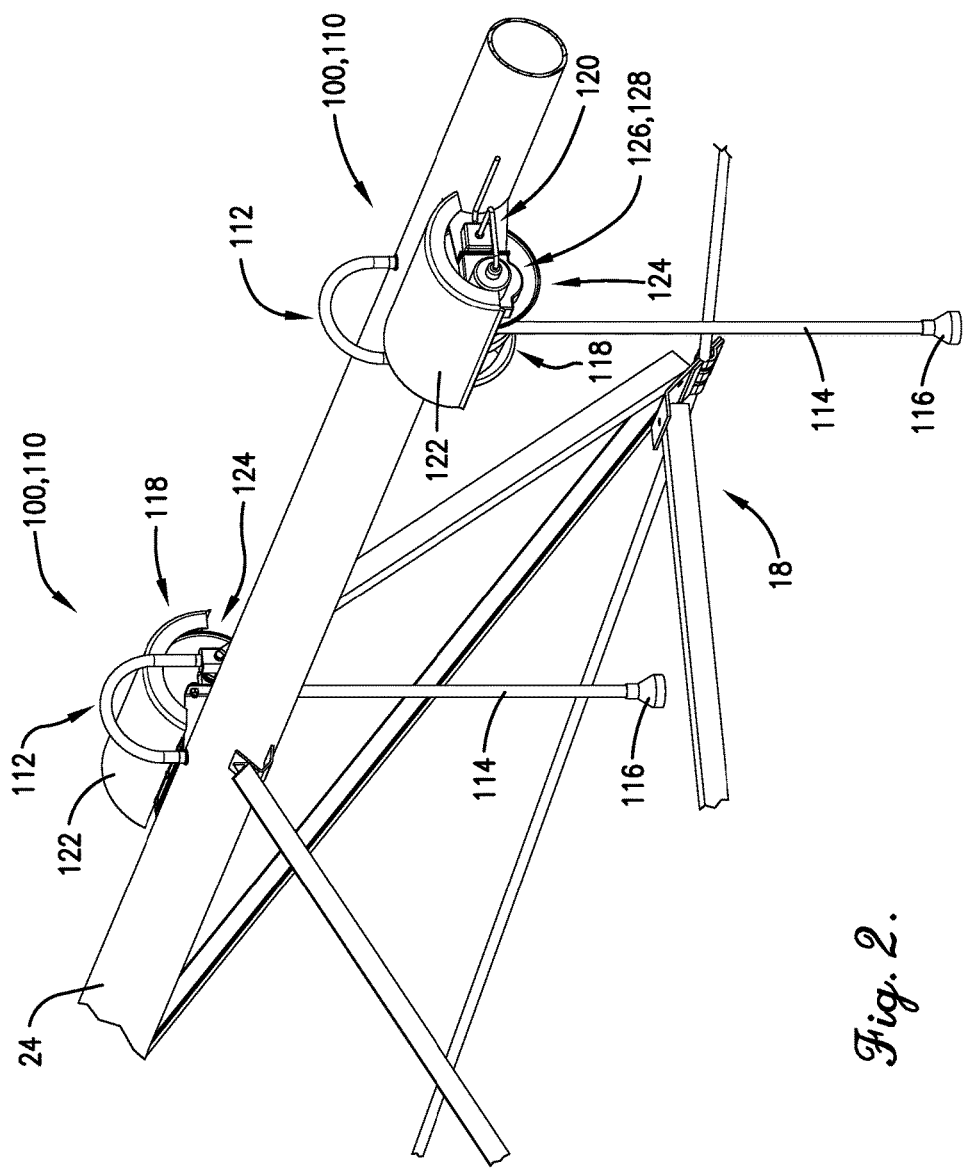
FIG. 2 is a perspective view of a portion of the irrigation system illustrating two drop hose and nozzle assemblies and two nozzle height adjustment subsystems.
Figure 3:
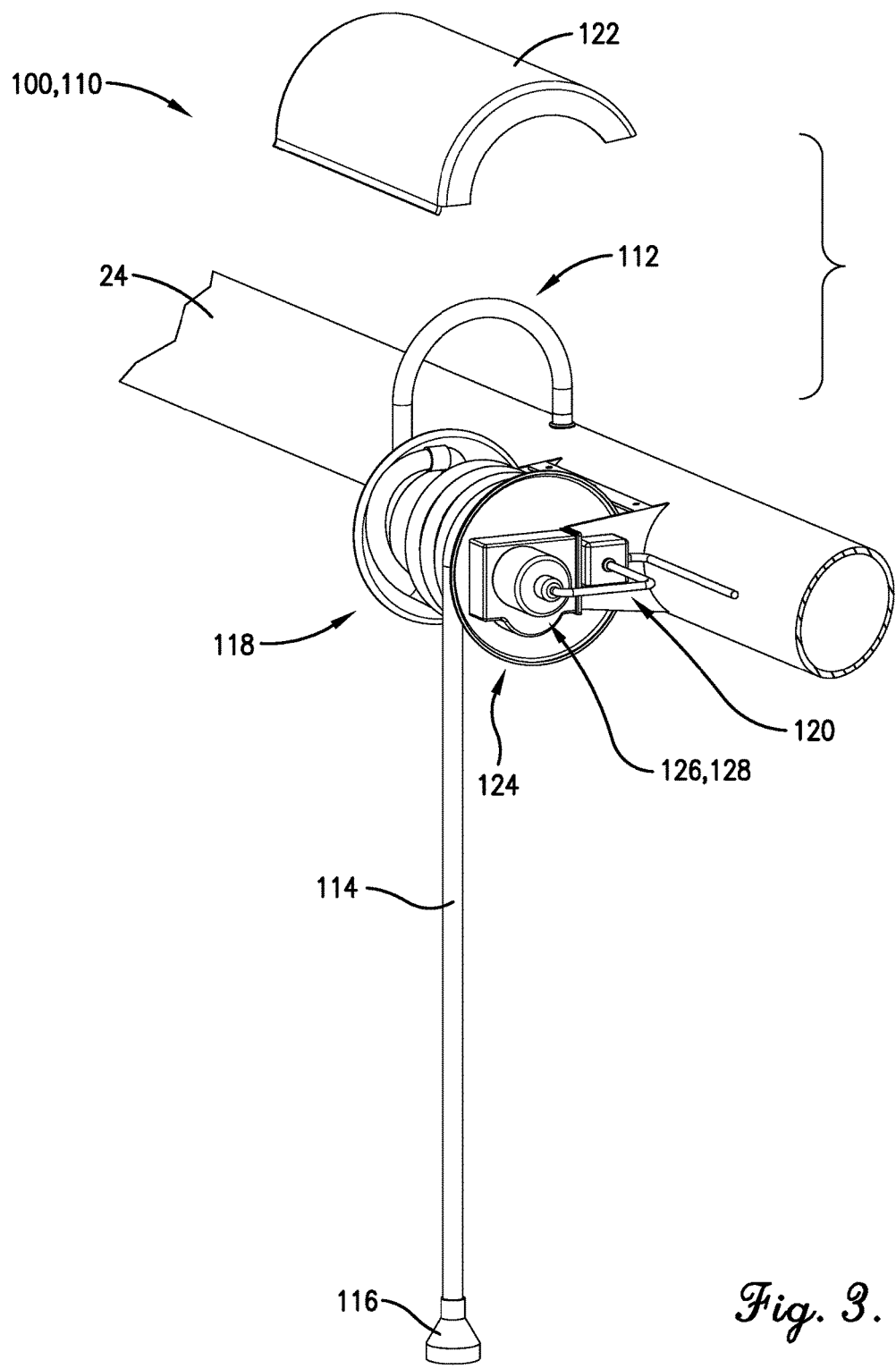
FIG. 3 is a perspective view from a forward side of one drop hose and nozzle assembly and one nozzle height adjustment subsystem.
Figure 4:
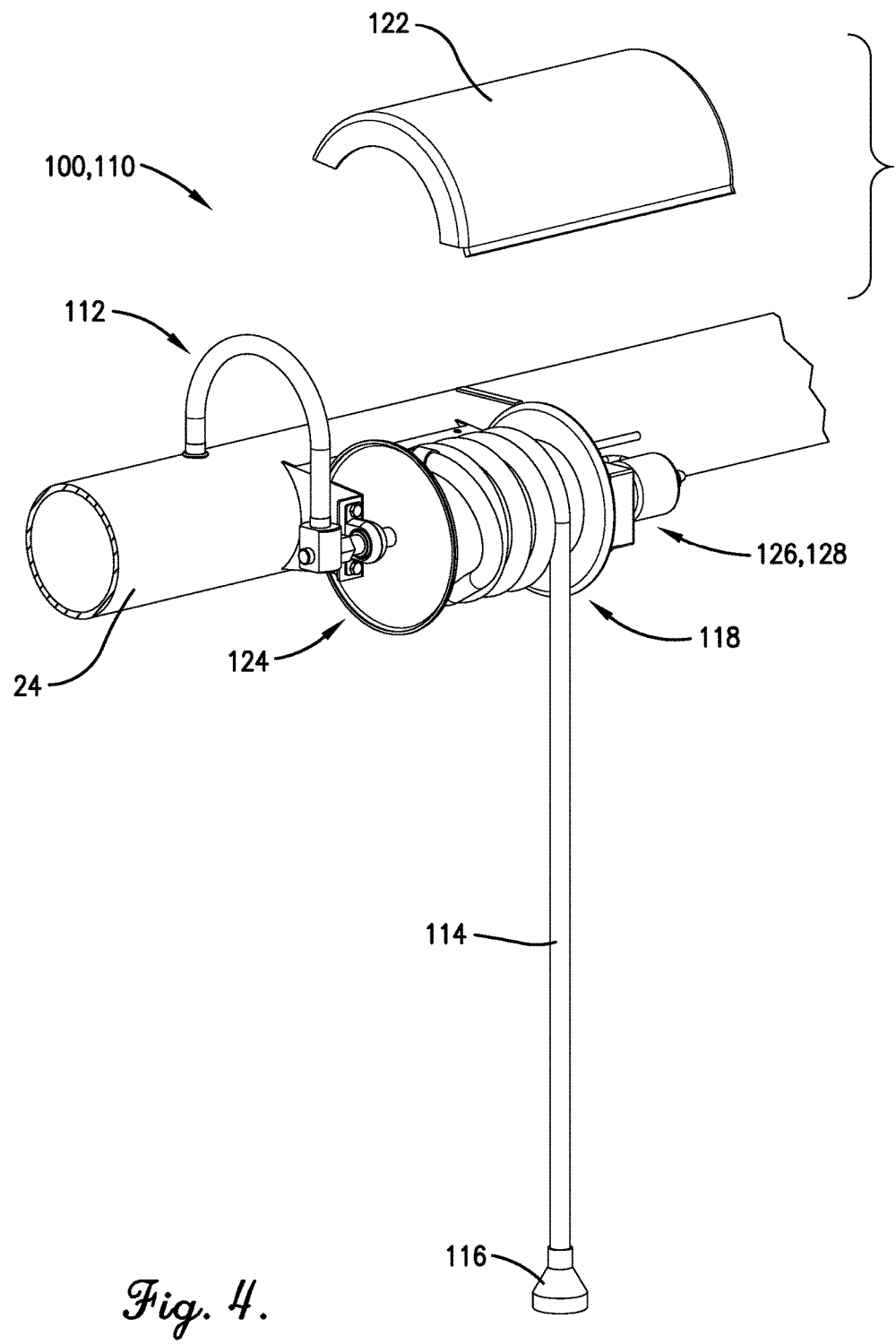
FIG. 4 is a perspective view from a rear side of one drop hose and nozzle assembly and one nozzle height adjustment subsystem.

Each nozzle height adjustment subsystem 110 may include a height adjustment mechanism 118 and a control device 120, as seen in FIGS. 2 and 3. The height adjustment mechanism 118 generally adjusts the height of the nozzle 116 above the ground and may include an optional cover 122, a spool 124, and a rotation device 126, as seen in FIG. 3. The cover 122 may be constructed from materials such as plastics or metals and may include an arcuate or arch-shape wall which is positioned over the spool 124 and the rotation device 126. The cover 122 may be attached to one of the water conduit sections 24A-D.

The spool 124 may have a traditional spool or hose reel shape with a center cylindrical hub and first and second disc-shaped sidewalls, each connected to an opposing end of the hub. The spool 124 may be mounted to one of the water conduit sections 24A-D through a bracket or the like. The spool 124 may further include a first coupler (likely threaded), positioned on the hub between the sidewalls, to which the drop hose 114 may be connected and a second coupler (likely threaded), positioned adjacent one of the sidewalls, to which the flexible portion of the connecting hose 112 may be connected. The hub may receive the drop hose 114, which wraps around the hub when the spool 124 is rotated in a first direction and unwraps when the spool 124 is rotated in a second, opposing direction. The spool 124 may further include teeth, cogs, notches, or other locking features on an inner surface of the hub which form an internal gear, not necessarily seen in the figures.

The rotation device 126 generally provides rotation of the spool 124 and may be embodied by hydraulic, pneumatic, or electrical actuating devices. Hydraulic devices may utilize fluid, such as the fluid flowing through the water conduit sections 24A-D, to rotate a wheel, for example, attached to the spool 124. Pneumatic devices may utilized pressurized air to rotate the spool 124. Electrical actuating devices, such as a solenoid, may utilize a linear translation to rotational converter, such as a rack and pinion, to rotate the spool 124. However, an exemplary rotation device 126, as seen in the figures, may include a motor 128 such as a direct current (DC) motor, an alternating current (AC) motor, a servo motor, a stepper motor, and so forth. The motor 128 may include a shaft 130 and may be capable of rotating the shaft 130 in a first direction or a second, opposing direction, wherein the first direction may be clockwise and the second direction may be counter-clockwise, or vice-versa. In some embodiments, the shaft 130 of the motor 128 may couple to a gear assembly, as shown in FIGS. 5 and 6, which, in turn, couples to the spool 124, such that the motor 128 rotates the spool 124 through the gear assembly. In other embodiments, the shaft 130 of the motor 128 may directly couple to the spool 124 without any intervening mechanisms. In all embodiments, rotation of the shaft 130 in the first direction rotates the spool 124 in the first direction and rotation of the shaft 130 in the second direction rotates the spool 124 in the second direction. The motor 128 may receive an activation signal which provides energy to activate the motor 128 and determine the direction of rotation.

The control device 120, seen in FIG. 2, generally provides the activation signal to the motor 128 of the height adjustment mechanism 118 to activate the motor 128 and determine the direction of rotation. The control device 120 may be housed in a box or housing mounted on the bracket which holds the spool 124. Alternatively, the housing for the control device 120 may be mounted on one of the water conduit sections 24A-D. The control device 120 may include electrical and/or electronic circuits such as filters, amplifiers, rectifiers, transformers, relays, digital signal processors, microprocessors, microcontrollers, or the like, or combinations thereof. The activation signal may include an electric voltage, an electric current, an electric power, or the like. In addition, or instead, the activation signal may include data such as binary data or a sequence of pulses. The control device 120 may be electrically connected to the motor 128 of the height adjustment mechanism 118 in order to deliver the activation signal.

In various embodiments, the control device 120 may further include or communicate with a user interface (not shown in the figures) accessible on an outer surface of the housing. The user interface may include pushbuttons and/or switches that activate the motor 128 in either direction of rotation in order to allow a technician to manually adjust the height of the nozzle 116. Furthermore, in certain embodiments, the control device 120 may include or communicate with one or more sensors (not shown in the figures) that detect the height of the nozzle 116. The sensors may be optical, such as photodetectors that detector optical indicia on the drop hose 114, electro-mechanical, such as proximity switches that are activated as the drop hose 114 moves, or the like. In such embodiments, the sensors may be integrated with the height adjustment mechanism 118 or positioned within the vicinity of the height adjustment mechanism 118 and may communicate electronically with the control device 120. In some embodiments, the control device 120 may optionally include a communication element which provides wireless communication by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof.

The control device 120 may receive a control signal from an external controlling device, such as a computer or a server, which may oversee or control the operation of the irrigation system 10. The control signal may be received through cables or wires or wirelessly. When the control device 120 receives the control signal, the control device 120 may, in turn, transmit the activation signal to the motor 128 in order to activate the motor 128 to rotate in the first direction or the second direction. In an exemplary embodiment, when the control device 120 receives the control signal, it may close the contacts of a relay (that is part of the control device 120 electrical circuitry) which allows electric power (or voltage or current) from an external electric power source to flow to the motor 128. The activation signal may additionally or alternatively include binary data or a sequence of pulses. In some embodiments, a polarity (positive or negative) or a level of the activation signal, such as the value of voltage, current, or power, may determine the direction of rotation of the shaft 130 of the motor 128. In other embodiments, data may determine the direction of rotation of the shaft 130.

The nozzle height adjustment subsystem 110 may operate as follows. The height adjustment mechanism 118 may be attached to one of the water conduit sections 24A-D in proximity to the location where one connecting hose 112 is attached to the water conduit section 24A-D. The control device 120 may be mounted to the water conduit section 24A-D in proximity to the height adjustment mechanism 118. A multiconductor cable or cord may be connected from the electric circuitry of the control device 120 to the motor 128 of the height adjustment mechanism 118.

The drop hose 114 may be adjusted, using the user interface of the control device 120, to a certain length corresponding to a certain height of the nozzle 116 above the ground after seeds have been planted. If the control device 120 includes sensors, the sensors may be calibrated, reset, or set to a starting height. The irrigation system 10 may function as normal—rotating and spraying the crops as necessary with each connecting hose 112 receiving fluid from one of the water conduit sections 24A-D, each drop hose 114 receiving fluid from the connecting hose 112, and each nozzle 116 receiving fluid from the drop hose 114. At regularly scheduled intervals or as determined by atmospheric conditions, such as temperature, humidity, wind speed and direction, solar radiation, etc., crop parameters, such as crop type, crop physiology, plant emissions, etc., or ground conditions such as soil moisture, the external controlling device may generate the control signal to the control device 120. The control signal may indicate an absolute height at which the nozzle 116 should be positioned or whether the nozzle 116 should be raised or lowered and by what distance. The control device 120 may interpret the control signal and may generate the activation signal to the motor 128 of the height adjustment mechanism 118. The motor 128 may then be activated and may rotate in the direction as determined by the activation signal. For example, in a first direction, the motor 128 may rotate the spool 124 such that the drop hose 114 wraps around the spool 124—thereby raising the nozzle 116. In a second direction, the motor 128 may rotate the spool 124 such that the drop hose 114 unwraps from the spool 124—thereby lowering the nozzle 116.

In some embodiments, sensors in communication with the control device 120 may detect and feed back the height of the nozzle 116, and once the nozzle 116 is at the correct height, the control device 120 may stop generating the activation signal. In other embodiments, sensors may not be included, so the control device 120 may generate the activation signal in an open-loop, dead reckoning fashion, wherein the activation signal is generated for a certain period of time, to include certain data, or to include a certain number of pulses. In such embodiments, motors, such as stepper motors or servo motors, may be programmed to rotate by a certain angular value. Given the diameter of the hub of the spool 124, the diameter of the drop hose 114, and the number of times the drop hose 114 is wrapped around the hub, among other parameters, the value of the angular rotation of the spool 124 could be calculated in order to raise or lower the nozzle 116 by a certain distance.

The drop hose and nozzle assembly 100 and nozzle height adjustment subsystem 110 combinations may be positioned on the water conduit sections 24A-D with a spacing determined by the dimensions of the spray path of each nozzle 116. Typically, each water conduit section 24A-D may have up to a dozen drop hose and nozzle assembly 100 and nozzle height adjustment subsystem 110 combinations mounted thereon.

During operation, it is possible that each nozzle 116, or groups of nozzles 116, may be adjusted to a different height based on changes in the terrain or the types of crops—as more than one type of crop may be planted in the area irrigated by the irrigation system 10. In such situations, each control device 120 may be individually addressable and may receive a control signal that instructs the control device 120 to adjust its associated nozzle 116 to a unique height.

The nozzle height adjustment subsystem 110 has been discussed and illustrated for implementation with the central pivot irrigation system 10. It is within the scope of the current invention that the nozzle height adjustment subsystem 110 may readily be utilized with irrigation systems, such as, for example, lateral or linear move irrigation systems, or other irrigation systems that deliver fluid to crops through drop hose and nozzle assemblies.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A nozzle height adjustment subsystem to adjust a height above ground of a single drop hose of an irrigation system, the nozzle height adjustment subsystem comprising:
   a single spool including a central hub, the single spool configured to retain the single drop hose to which a nozzle is attached;
   a single rotation device coupled to the single spool, the single rotation device, when activated, being operable to rotate the single spool in a first direction to wind the single drop hose on the single spool or a second, opposite direction to unwind the single drop hose from the single spool; and
   a single control device including electronic circuitry configured to generate a signal that activates the single rotation device.

2. The nozzle height adjustment subsystem of claim 1, wherein the single rotation device includes an electric motor with a shaft coupled to the hub such that the motor rotates the single spool when the electric motor receives the signal from the single control device.

3. The nozzle height adjustment subsystem of claim 2, further comprising a cover covering the single spool and the electric motor, the cover configured to attach to a fluid conduit.

4. The nozzle height adjustment subsystem of claim 2, wherein the single control device provides an electrical connection from an electric power source to the electric motor to activate the electric motor.

5. The nozzle height adjustment subsystem of claim 1, wherein the single spool includes a first coupler configured to connect to the single drop hose and a second coupler configured to connect to a connecting hose which couples to a fluid conduit.

6. A nozzle height adjustment subsystem to adjust a height above ground of a single drop hose of an irrigation system, the nozzle height adjustment subsystem comprising:
   a single spool including a central hub, the spool configured to retain the single drop hose to which a nozzle is attached;
   a single electric motor including a shaft coupled to the central hub, the single electric motor, when activated, being operable to rotate the single spool in a first direction to wind the single drop hose on the single spool or a second, opposite direction to unwind the single drop hose from the single spool; and
   a single control device including electronic circuitry configured to generate a signal that activates the single electric motor.

7. The nozzle height adjustment subsystem of claim 6, further comprising a cover covering the single spool and the single electric motor, the cover configured to attach to a fluid conduit.

8. The nozzle height adjustment subsystem of claim 6, wherein the single spool includes a first coupler configured to connect to the single drop hose and a second coupler configured to connect to a connecting hose which couples to a fluid conduit.

9. The nozzle height adjustment subsystem of claim 6, wherein the single control device provides an electrical connection from an electric power source to the single electric motor to activate the single electric motor.

10. An irrigation system comprising:
a plurality of mobile support towers;
a fluid conduit supported by the mobile support towers, the fluid conduit configured to provide fluid from a fluid source;
a plurality of drop hose and nozzle assemblies, each drop hose and nozzle assembly including:
  a drop hose,
  a nozzle connected to one end of the drop hose, the nozzle configured to disperse fluid, and
  a connecting hose coupled to the fluid conduit and configured to provide fluid to only the drop hose and nozzle; and
a plurality of nozzle height adjustment subsystems allowing a height above ground of each drop hose to be adjusted individually, each nozzle height adjustment subsystem including:
  a spool including a central hub, the spool retaining at least a portion of one drop hose,
  an electric motor including a shaft coupled to the central hub, the electric motor, when activated, being operable to rotate the spool in a first direction or a second, opposite direction, and
  a control device including electronic circuitry configured to generate a signal that activates the electric motor.

11. The irrigation system of claim 10, wherein each nozzle height adjustment subsystem further includes a housing cover covering the spool and the electric motor, the cover configured to attach to a fluid conduit.

12. The irrigation system of claim 10, wherein each spool includes a first coupler connected to the drop hose and a second coupler connected to the connecting hose.

13. The irrigation system of claim 10, wherein the control device provides an electrical connection from an electric power source to the electric motor to activate the electric motor.

* * * * *